United States Patent
Nalli et al.

(10) Patent No.: US 10,372,602 B2
(45) Date of Patent: Aug. 6, 2019

(54) ORDERING UPDATES FOR NONVOLATILE MEMORY ACCESSES

(71) Applicant: Hewlett Packard Enterprise Development LP, Houston, TX (US)

(72) Inventors: Sanketh Nalli, Palo Alto, CA (US); Haris Volos, Palo Alto, CA (US); Kimberly Keeton, San Francisco, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 71 days.

(21) Appl. No.: 15/545,901

(22) PCT Filed: Jan. 30, 2015

(86) PCT No.: PCT/US2015/013958
§ 371 (c)(1),
(2) Date: Jul. 24, 2017

(87) PCT Pub. No.: WO2016/122657
PCT Pub. Date: Aug. 4, 2016

(65) Prior Publication Data
US 2018/0018258 A1    Jan. 18, 2018

(51) Int. Cl.
*G06F 12/02* (2006.01)
*G06F 12/0804* (2016.01)
*G06F 12/0868* (2016.01)

(52) U.S. Cl.
CPC ...... *G06F 12/0238* (2013.01); *G06F 12/0804* (2013.01); *G06F 12/0868* (2013.01);
(Continued)

(58) Field of Classification Search
None
See application file for complete search history.

(56) References Cited

U.S. PATENT DOCUMENTS

| | | | | |
|---|---|---|---|---|
| 5,123,099 A | * | 6/1992 | Shibata | G06F 11/1666 711/120 |
| 5,276,849 A | * | 1/1994 | Patel | G06F 12/0806 365/230.05 |

(Continued)

FOREIGN PATENT DOCUMENTS

EP    1323044    5/2010

OTHER PUBLICATIONS

Kumud Bhandari, "Implications of CPU Caching on Byte-addressable Non-Volatile Memory Programming," HP Laboratories, HPL-2012-236, Dec. 6, 2012, 7 pps. <http://www.hpl.hp.com/techreports/2012/HPL-2012-236.pdf>.

(Continued)

*Primary Examiner* — Kevin Verbrugge
(74) *Attorney, Agent, or Firm* — Hewlett Packard Enterprise Patent Department

(57) ABSTRACT

Examples relate to ordering updates for nonvolatile memory accesses. In some examples, a first update that is propagated from a write-through processor cache of a processor is received by a write ordering buffer, where the first update is associated with a first epoch. The first update is stored in a first buffer entry of the write ordering buffer. At this stage, a second update that is propagated from the write-through processor cache is received, where the second update is associated with a second epoch. A second buffer entry of the write ordering buffer is allocated to store the second update. The first buffer entry and the second buffer entry can then be evicted to non-volatile memory in epoch order.

13 Claims, 2 Drawing Sheets

(52) U.S. Cl.
CPC ........... *G06F 2212/1028* (2013.01); *G06F 2212/1032* (2013.01); *G06F 2212/7203* (2013.01); *Y02D 10/13* (2018.01)

(56) References Cited

U.S. PATENT DOCUMENTS

| | | |
|---|---|---|
| 6,195,727 B1 | 2/2001 | Islam et al. |
| 7,408,834 B2 | 8/2008 | Conley |
| 8,019,943 B2 | 9/2011 | Yu |
| 8,046,548 B1 * | 10/2011 | Chatterjee ........... G06F 11/2064 707/655 |
| 2005/0195635 A1 | 9/2005 | Conley et al. |
| 2008/0256294 A1 | 10/2008 | Gill |
| 2012/0254507 A1 | 10/2012 | Chang |
| 2014/0068144 A1 | 3/2014 | Fai |
| 2014/0115241 A1 | 4/2014 | Wei |

OTHER PUBLICATIONS

International Searching Authority, The International Search Report and the Written Opinion, PCT/US2015/013958, dated Oct. 22, 2015, 10 Pgs.

Jeremy Condit et al, Better I/O Through Byte-Addressable, Persistent Memory, SOSP 2009, 14 Pgs.

Ellis Giles, Bridging the Programming Gap Between Persistent and Volatile Memory Using WrAP, May 14-16, 2013, 10 Pgs., <http://www.ece.rice.edu/~pjv/frontiers2013.pdf>.

* cited by examiner

US 10,372,602 B2

ORDERING UPDATES FOR NONVOLATILE MEMORY ACCESSES

BACKGROUND

Byte-addressable non-volatile memory (NVM) technologies, such as memristor, provide persistent data storage that can be accessed directly through processor load and store instructions. Processors can employ fast on-chip caches to hide the latency to access the NVM, which may reorder updates to NVM and complicate the implementation of crash-consistency protocols. In this case, augmenting write-back caches with ordering mechanisms or explicitly flushing cache lines can be used to ensure crash-consistency.

BRIEF DESCRIPTION OF THE DRAWINGS

The following detailed description references the drawings, wherein.

DETAILED DESCRIPTION

As detailed above, augmenting write-back caches with ordering mechanisms or explicitly flushing cache lines can be used to ensure crash-consistency. Write-through caching offers an alternative to write-back caching that may be less complicated to implement. With write-through caching, writes appear to NVM in program order, which removes the need for explicitly flushing dirty cache lines to NVM and simplifies the implementation of crash-consistent updates. However, write-through caching may have a performance impact on write-intensive workloads as each write suffers from the latency to NVM.

Examples described herein instead add a small write ordering buffer (WOB) between a write-through processor cache and NVM. The WOB can help improve the cache hit ratio of common file system workloads by exploiting spatial locality that is common in these workloads. Orthogonal to the WOB, extensions to the LRU cache replacement policy can also be used for properly sharing the cache space between the processor cache and the NVM.

In some examples, a first update that is propagated from a write-through processor cache of a processor is received by a write ordering buffer, where the first update is associated with a first epoch. The first update is stored in a first buffer entry of the write ordering buffer. At this stage, a second update that is propagated from the write-through processor cache is received, where the second update is associated with a second epoch. A second buffer entry of the write ordering buffer is allocated to store the second update. The first buffer entry and the second buffer entry can then be evicted to non-volatile memory in epoch order. In this example, the epoch of buffer entries determine the order in which the buffer entries are evicted. For example, epoch order may correspond to a first in first out order that ensures updates are evicted in the proper order.

Figure 1:
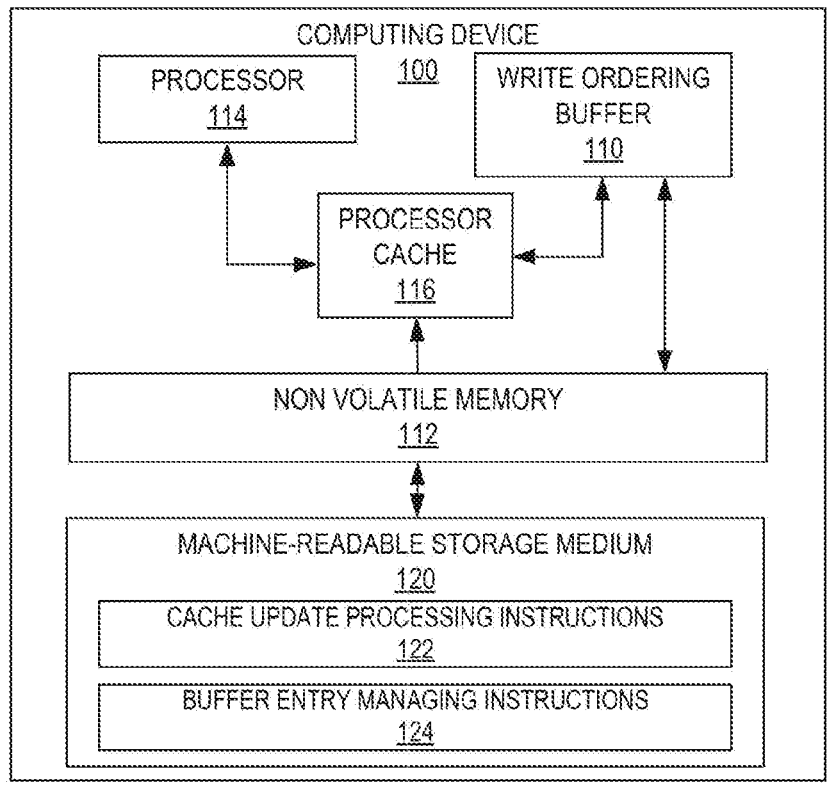
FIG. 1 is a block diagram of an example computing device for ordering updates for nonvolatile memory accesses.

Referring now to the drawings, FIG. 1 is a block diagram of an example computing device 100 for ordering updates for nonvolatile memory accesses. Computing device 100 may be any computing device (e.g., server, desktop computer, etc.) that is capable of the functionality described below. In FIG. 1, computing device 100 includes a write ordering buffer (WOB) 110, non-volatile memory (NVM) 112, a processor 114, processor cache 116, and a machine-readable storage medium 120.

NVM 112 is memory that is capable of storing information even when not powered. Examples of NVM include read-only memory (ROM), flash memory, byte-addressable NVM, phase change memory, spin torque transfer memory, etc.

WOB 110 is an intermediate buffer between NVM 112 and processor cache 116. WOB 110 comprises a number of buffer entries with each entry having a size equal to the cache line size of processor cache 116. Write ordering may be expressed in WOB 110 by grouping sequences of writes into epochs. WOB 110 may be implemented as a first in first out (FIFO) buffer that evicts cache lines in epoch order.

Processor 114 may be one or more central processing units (CPUs), microprocessors, and/or other hardware devices suitable for execution of instructions stored in machine-readable storage medium 120. Processor 114 may fetch, decode, and execute instructions 122, 124 to enable ordering updates for nonvolatile memory accesses, as described below. As an alternative or in addition to retrieving and executing instructions, processor 114 may include one or more electronic circuits comprising a number of electronic components for performing the functionality of one or more of instructions 122, 124.

Processor cache 116 is used by processor 114 to reduce access times for data from NVM 112. Processor cache 116 is usually smaller and faster than NVM 112. In some cases, processor cache 116 is a write-through cache that implements a no-allocate write policy, which allocates a cache line only on a cache read miss.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a hard disk, a solid-state drive (SSD), an optical disc, and the like. As described in detail below, machine-readable storage medium 120 may be encoded with executable instructions for ordering updates for nonvolatile memory accesses.

Cache update processing instructions 122 propagates updates to processor cache 116 and WOB 110. Each update may be associated with an epoch, which describes the order that the updates should be committed to NVM 112. For each update, cache updating processing instructions 122 determines if a buffer entry associated with the epoch exists in WOB 110. If the buffer entry for the epoch already exists, the corresponding update can be coalesced into the buffer entry. If the buffer entry for the epoch does not exist, a buffer entry for the epoch can be created so that the corresponding update can be propagated to the new buffer entry.

Buffer entry managing instructions 124 manages the eviction of buffer entries. Specifically, buffer entry managing instructions 124 evicts the buffer entries of write ordering buffer 110 in epoch order. Buffer entries can be evicted when space is needed for new buffer entries. In this case, older buffer entries with respect to epoch order is evicted first. Because the write ordering buffer 110 is evicted in epoch order, the integrity of NVM 112 is maintained such that if there is a power failure, data consistency metadata properly reflect the state of data in NVM 112. Data consistency metadata, such as but not limited to validity flags, should be set after updates are committed to NVM 112, so if there is a failure, NVM 112 can be restored to a consistent state based on the validity flags.

Figure 2:
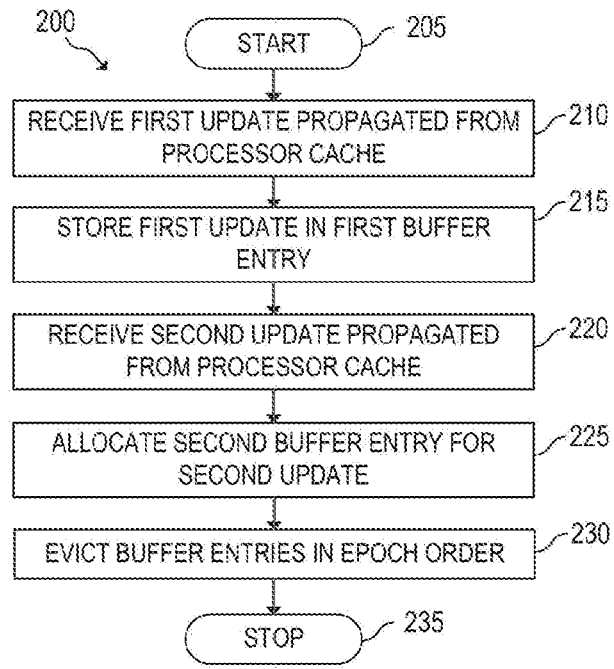
FIG. 2 is a flowchart of an example method for execution by a computing device for ordering updates for nonvolatile memory accesses.

FIG. 2 is a flowchart of an example method 200 for execution by computing device 100 for ordering updates for nonvolatile memory accesses. Although execution of method 200 is described below with reference to computing device 100 of FIG. 1, other suitable devices for execution of method 200 may be used. Method 200 may be implemented in the form of executable instructions stored on a machine-readable storage medium, such as storage medium 120, and/or in the form of electronic circuitry.

Method 200 may start in block 205 and continue to block 210, where computing device 100 propagates a first update of the processor cache to a write ordering buffer. In other words, as updates hit the processor cache, the updates are also propagated to the write ordering buffer. In block 215, computing device 100 stores the first update in a first buffer entry of the write ordering buffer. The first update is associated with a first epoch number, and the first buffer entry that is associated with the first epoch number can be created to store the first update.

In block 220, computing device 100 propagates a second update of the processor cache to the write ordering buffer. In block 225, computing device 100 allocates a second buffer entry of the write ordering buffer for the second update. The second update is associated with a second epoch number, and because a buffer entry that is associated with the second epoch number does not exist, the second update is propagated into the newly created second buffer.

In block 230, computing device 100 evicts the write ordering buffer in epoch order. In other words, the write buffers are evicted in a FIFO order so that the integrity of NVM is maintained. Method 200 may then continue to block 235, where method 200 may stop.

Figure 3:
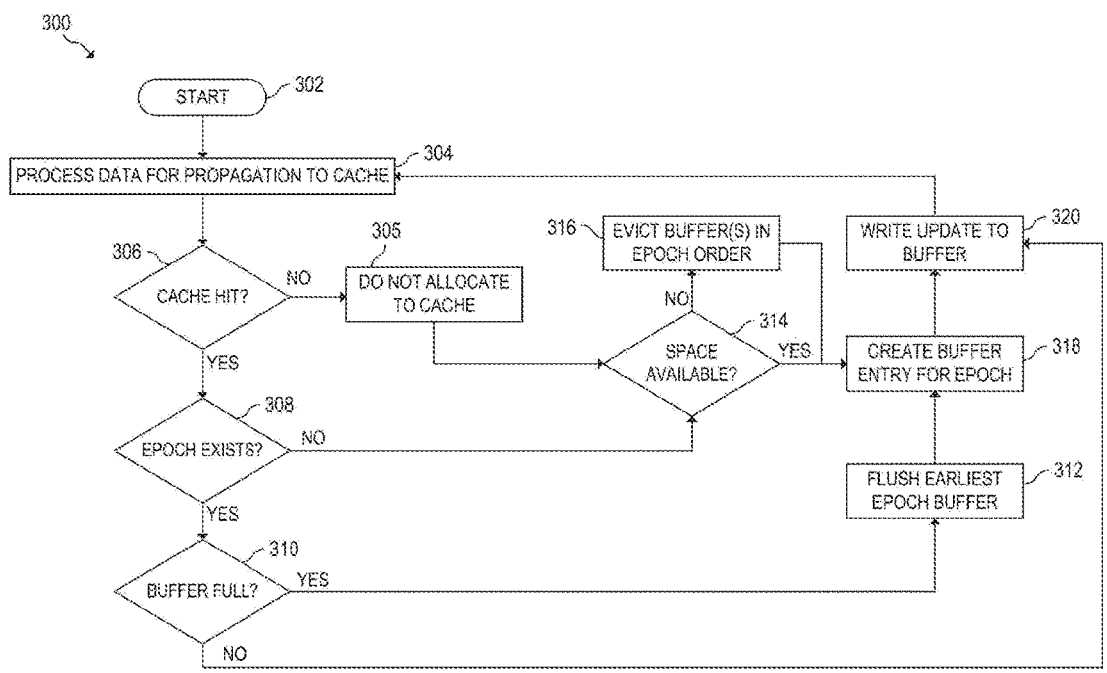
FIG. 3 is a flowchart of an example method for execution by a computing device for processing ordered updates and read operations in nonvolatile memory accesses.

FIG. 3 is a flowchart of an example method 300 for execution by computing device 100 for processing ordered updates in nonvolatile memory accesses. Read operations may be handled by a different mechanism such as the one shown below in the pseudocode for the nvram_load function. Although execution of method 300 is described below with reference to computing device 100 of FIG. 1, other suitable devices for execution of method 300 may be used. Method 300 may be implemented in the form of executable instructions stored on a machine-readable storage medium and/or in the form of electronic circuitry.

Method 300 may start in block 302 and proceed to block 304, where computing device 100 processes data for propagation to the processor cache and a write ordering buffer. In block 306, it is determined if each logical portion of data is a cache hit. If a portion is a write miss, then a cache line entry is not created in the processor cache in block 305 but only in the write ordering buffer as described below with respect to blocks 314-320. Method 300 can then return to block 304 to process further data for propagation.

If a portion is a cache hit, then it is determined whether a buffer entry for the corresponding epoch of the cache update exists in block 308. Each buffer entry may have a dirty bit that can be used to specify whether the corresponding buffer entry is dirty. In some cases, each buffer entry can include multiple dirty bits that specify whether subsets (e.g., each byte of word of the buffer entry can have a dirty bit, etc.) of the buffer entry are dirty. The dirty bits allow the write ordering buffer to act as a coalescing buffer that is capable of coalescing cache updates to a preexisting buffer entry. If a buffer entry for the corresponding epoch does exist, computing device 100 determines if the write ordering buffer has space for the cache update in block 310. If the write ordering buffer has space, computing device 100 writes the cache update to the buffer entry of the corresponding epoch in block 320. If the write ordering buffer does not have space, computing device 100 flushes the buffer entry of the earliest epoch (assuming FIFO order) in block 312. As described above, the buffer entry is evicted in epoch order. Then, in block 318, a new buffer entry for the corresponding epoch can be created before method 300 proceeds to block 320, where computing device 100 writes the cache update to the new buffer entry for the corresponding epoch.

If a buffer entry for the corresponding epoch does not exist, computing device 100 determines if there is sufficient space to allocate a new buffer entry for the corresponding epoch in block 314. If space is available, method 300 proceeds to block 318 to create a new buffer entry for the corresponding epoch. If space is not available, computing device 100 evicts the buffer entries of the write ordering buffer in epoch order to free space in block 316. At this stage, method 300 proceeds to block 318 to allocate a new buffer entry for the corresponding epoch.

In this manner, the eviction of cache updates in the processor cache are managed by the write ordering buffer so that the integrity of NVM is maintained. Pseudo code for implementing an example of method 300 is shown below:

```
nvram_store(addr, val):
    IF addr in cache: // cache write hit -- no-allocate policy
        c = cache.cache_line_index(addr)
        cache[c] = val
    IF addr in WOB:
        i = WOB.location(addr)
        IF WOB.epoch(addr) == WOB.cur_epoch:
            WOB[i] |= val // coalesce write
        ELSE:
            // an older epoch includes the memory location addr
            // allocate a new entry at the tail
            IF WOB.full( ):
                flush WOB.head
                WOB.head = WOB.head + 1 MOD WOB.size
            WOB.tail = WOB.tail + 1 MOD WOB.size
            WOB[WOB.tail] = val
            WOB[WOB.tail].epoch = WOB.cur_epoch
    ELSE:
        // memory address does not exist in WOB
        IF WOB.full( ):
            flush WOB.head
            WOB.head = WOB.head + 1 MOD WOB.size
        WOB.tail = WOB.tail + 1 MOD WOB.size
        WOB[WOB.tail] = val
        WOB[WOB.tail].epoch = WOB.cur_epoch
nvram_load(addr):
    IF addr in cache:
        return cache.value(addr)
    ELSE:
        c = cache.allocate_cache_line
        IF addr in WOB:
            cache[c] = WOB.read(addr)
        ELSE:
            cache[c] = NVRAM.read(addr)
evict_head( ):
    // flush head
    WOB.tail = next_buffer(WOB.tail)
```

In this example, the nvram_store function is configured to store cache updates to the write ordering buffer; the nvram_load function is configured to retrieve data from cache, write ordering buffer, or NVM; and the evict_head is configured to evict the write ordering buffer in a FIFO (i.e., epoch) order.

During operation of the processor of computing device 100, a read that misses in the processor cache should bring the most recent version of the corresponding cache line into the processor cache. The processor cache initially checks whether the write ordering buffer contains the most recent version before reading it from NVM. If the cache needs space to store the newly read cache line, then it selects a victim cache line based on a least recently used (LRU) or other replacement policy and evicts the cache line. As cache lines are always clean because the write ordering buffer ensures updates are committed in epoch order, the processor cache does not need to write back the victim cache line.

The foregoing disclosure describes a number of examples for ordering updates for nonvolatile memory accesses of a computing device. In this manner, the examples disclosed herein ensure the validity of NVM is maintained by using a write ordering buffer that is between the processor cache and NVM to evict memory updates in epoch order.

We claim:

1. A system for ordering updates for nonvolatile memory accesses, the system comprising:
    a processor to process a plurality of updates;
    a write-through processor cache that is operatively connected to the processor;
    non-volatile memory;
    a write ordering buffer that is operatively connected to the write-through processor cache and the non-volatile memory, wherein the write ordering buffer comprises a plurality of buffer entries that are each allocated using a cache line size of the write-through processor cache, the write ordering buffer to:
        receive a first update of the plurality of updates that is propagated from the write-through processor cache, wherein the first update is associated with a first epoch;
        store the first update in a first buffer entry of the plurality of buffer entries;
        receive a second update of the plurality of updates that is propagated from the write-through processor cache, wherein the second update is associated with a second epoch;
        allocate a second buffer entry of the plurality of buffer entries, wherein the second update is stored in the second buffer entry;
        in response to determining that the second update is less than the cache line size, update a dirty bit associated with the second buffer entry to specify that the second buffer entry is dirty;
        evict the first buffer entry and the second buffer entry to the non-volatile memory in epoch order;
        receive a third update of the plurality of updates that is propagated from the write-through processor cache, wherein the third update is associated with a second epoch; and
        coalesce the third update into the second buffer entry.

2. The system of claim 1, wherein the write-through processor cache implements a no-allocate write policy.

3. The system of claim 1, wherein the dirty bit specifies that a subset of the second buffer entry is dirty, and wherein the subset is a byte or word of the second buffer entry.

4. The system of claim 1, wherein the first update is stored in the first buffer entry in response to determining that the first buffer entry associated with the first epoch is available.

5. The system of claim 1, wherein the epoch order is a first in first out order.

6. A method for ordering updates for nonvolatile memory accesses, the method comprising:
    receiving, by a write ordering buffer, a first update of a plurality of updates that is propagated from a write-through processor cache of a processor, wherein the first update is associated with a first epoch;
    storing the first update in a first buffer entry of a plurality of buffer entries of the write ordering buffer;
    receiving a second update of the plurality of updates that is propagated from the write-through processor cache, wherein the second update is associated with a second epoch;
    allocating a second buffer entry of the plurality of buffer entries, wherein the second update is stored in the second buffer entry;
    in response to determining that the second update is less than the cache line size, updating a dirty bit associated with the second buffer entry to specify that the second buffer entry is dirty;
    evicting the first buffer entry and the second buffer entry to non-volatile memory in a first in first out order;
    receiving a third update of the plurality of updates that is propagated from the write-through processor cache, wherein the third update is associated with a second epoch; and
    coalescing the third update into the second buffer entry.

7. The method of claim 6, wherein the write-through processor cache implements a no-allocate write policy.

8. The method of claim 6, wherein the dirty bit specifies that a subset of the second buffer entry is dirty, and wherein the subset is a byte or word of the second buffer entry.

9. The method of claim 6, wherein the first update is stored in the first buffer entry in response to determining that the first buffer entry associated with the first epoch is available.

10. A non-transitory machine-readable storage medium encoded with instructions executable by a processor for ordering updates for nonvolatile memory accesses, the machine-readable storage medium comprising instructions to:
    receive a first update of a plurality of updates that is propagated from a write-through processor cache of a processor, wherein the first update is associated with a first epoch;
    in response to determining that a write ordering buffer includes a first buffer that is associated with the first epoch, store the first update in the first buffer entry of a plurality of buffer entries;
    receive a second update of the plurality of updates that is propagated from the write-through processor cache, wherein the second update is associated with a second epoch;
    allocate a second buffer entry of the plurality of buffer entries, wherein the second update is stored in the second buffer entry;
    to in response to determining that the second update is less than the cache line size, update a dirty bit associated with the second buffer entry to specify that the second buffer entry is dirty;
    evict the first buffer entry and the second buffer entry to non-volatile memory in epoch order; and
    receive a third update of the plurality of updates that is propagated from the write-through processor cache, wherein the third update is associated with a second epoch; and
    coalesce the third update into the second buffer entry.

11. The non-transitory machine-readable storage medium of claim 10, wherein the write-through processor cache implements a no-allocate write policy.

12. The non-transitory machine-readable storage medium of claim 11, wherein the dirty bit specifies that a subset of the second buffer entry is dirty, and wherein the subset is a byte or word of the second buffer entry.

13. The non-transitory machine-readable storage medium of claim 11, wherein the first update is stored in the first buffer entry in response to determining that the first buffer entry associated with the first epoch is available.

* * * * *